P. EVERETT.
RACE TRACK.
APPLICATION FILED MAY 8, 1912.
1,052,807.
Patented Feb. 11, 1913.
2 SHEETS—SHEET 2.
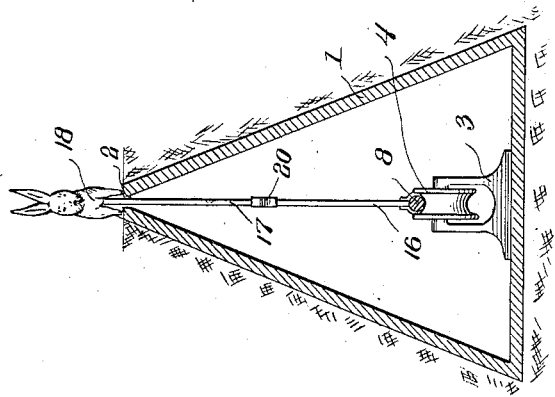
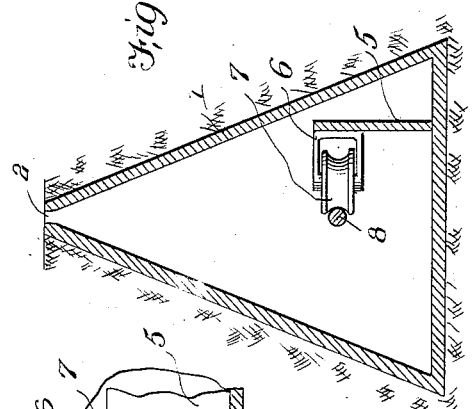
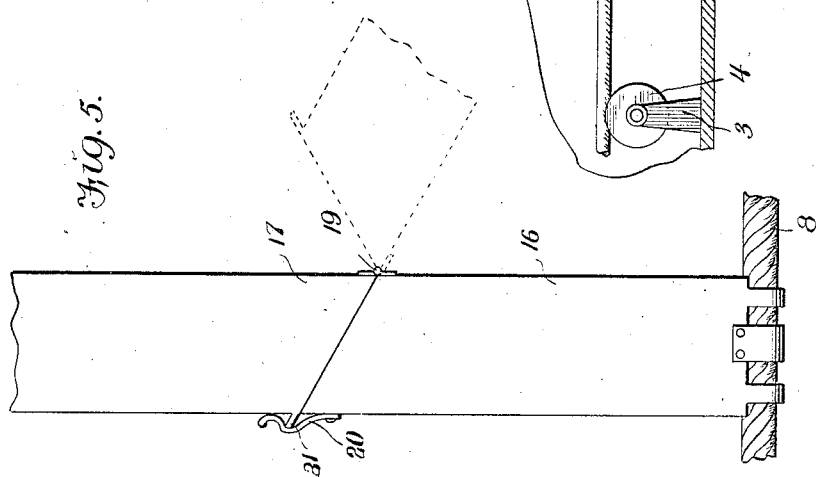
Inventor
Percy Everett.
Witnesses
William Smith
By Victor J. Evans
Attorney

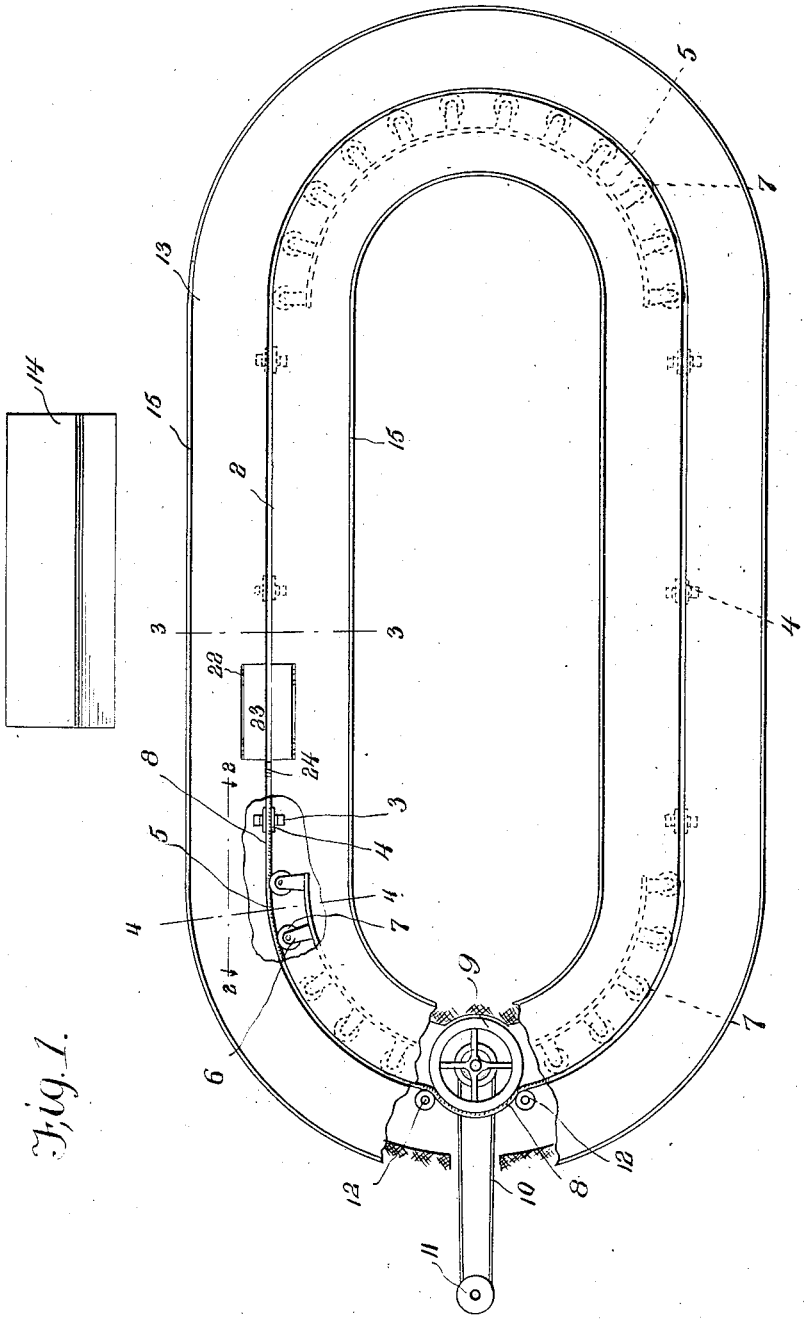

UNITED STATES PATENT OFFICE.

PERCY EVERETT, OF SAN ANTONIO, TEXAS.

RACE-TRACK.

1,052,807.                    Specification of Letters Patent.    Patented Feb. 11, 1913.

Application filed May 8, 1912.  Serial No. 695,974.

*To all whom it may concern:*

Be it known that I, PERCY EVERETT, a citizen of the United States, residing at San Antonio, in the county of Bexar and State of Texas, have invented new and useful Improvements in Race-Tracks, of which the following is a specification.

This invention relates to race tracks and the object of the invention is to provide a simple and efficient device whereby dogs may be trained to run rabbits, foxes, or the like.

A further object of the invention is to provide a device of this character wherein the artificial animal used is caused to disappear beneath the track at a predetermined time so as to prevent the same from being torn to pieces by the dogs.

Further objects of this invention will appear as the following specific description is read in connection with the accompanying drawing, which forms a part of this application, and in which:—

Figure 1 is a top plan view with parts broken away. Fig. 2 is a vertical section taken on the line 2—2 of Fig. 1. Fig. 3 is a transverse section on the line 3—3 of Fig. 1. Fig. 4 is a similar section on the line 4—4 of Fig. 1. Fig. 5 is a detail vertical section showing the supporting stem, in operative position in full lines and in inoperative position in dotted lines.

Referring more particularly to the drawing, 1 represents an annular casing which is preferably substantially V-shaped in cross section with its side members coming closely adjacent each other at the top to produce a slot 2. This casing is embedded in the ground with the upper ends of the sides flush with the surface thereof and carries upon its base within the casing and in vertical alinement with the slot, suitable bearing supports 3 in which are journaled grooved idlers 4. Also secured to the base are mounting plates 5 having bearing ears 6 secured thereto in which are journaled the pulleys 7. Passing around over the pulleys 4 and 7 is a cable 8 which also passes over a power pulley 9 driven through a belted connection 10 with a suitable drum 11 preferably rotated by a motor, not shown. Suitable idlers 12 hold the cable in engagement with the power wheel, as shown in Fig. 1. The track 13 may be treated in any suitable manner and preferably a grand stand is arranged along side the track, as indicated at 14, the track being defined by fences 15.

Secured to the cable and passing through the slot 2 is a mounting stem which is constructed in two parts 16 and 17 and upon the upper part is mounted an animal 18, here shown as the representation of a rabbit. The two parts of the stem 16 and 17 are hinged together, as shown at 19, and are held in upright position by means of the spring catch 20 carried by the part 16 and engaged with a lug 21 on the part 17.

At a certain predetermined point in the track, a well casing is connected to the casing 1 and is indicated at 22. Hinged to this casing are separate doors 23 which are operated in any suitable manner and bridging the slot 2 adjacent the well opening is a bolt 24 which, when engaged by the upper portion of the stem, will break the same, as shown in dotted lines in Fig. 5, and cause the rabbit or other animal to be projected into the well casing, as will be readily understood. Many ways may be devised for opening and closing the doors. None have been shown herein as this forms no part of the invention.

In the operation of the device, the imitation animal is set upon the stem with the same in upright position, the motor started, and the dogs turned loose from a suitable starting point. When the imitation animal reaches a predetermined point, the doors are opened preferably by a suitable lever mechanism, and when the same strikes the bolt, the animal is caused to disappear into the well casing 22, as will be readily understood, without stopping the operation of the cable. The casing is in effect a tunnel beneath the ground in which the imitation animal is adapted to travel after the section 17 has been depressed through the doors by coming into contact with the bolt.

What is claimed is:—

1. In a device of the class described, an underground endless cable, means for driving the cable, a supporting member traveling with the cable and projecting above the ground, and means to lower the supporting member below the surface of the ground.

2. In a race track, an underground endless cable, means for driving the cable, a two-part supporting member carried by and traveling with the cable, said supporting member projecting above the ground, and means to lower the upper portion of the supporting member below the surface of the ground.

3. In a race track, an endless underground cable, means for driving the cable, a two-part supporting member carried by the cable, and projecting above the ground, a hinge for connecting the parts of the supporting member, means for holding the parts of the supporting member in alinement with the upper portion projected above the ground, and an abutment lying in the path of the upper portion.

4. In a device of the class described, an underground endless cable, means for driving the same, a two-part supporting member having its parts hinged together and the upper part projecting above the ground, a resilient catch for holding the parts in alinement, and means for breaking the catch and for lowering the upper part below the surface of the ground.

5. In combination, a tunnel having a slot in the same, an endless cable traveling in the tunnel, a supporting member secured to the cable and passing through the slot, and an abutment arranged across the slot for lowering the supporting member into the tunnel.

6. In combination, an annular tunnel having a slot, an endless cable mounted therein, means to drive the cable, and a two-part supporting member connected to the cable and having a part projecting through the slot, a hinge for connecting the parts of the supporting member together, a spring cap for holding the parts of the supporting member in alinement, and an abutment arranged across the slot and adapted to engage the upper portion of the supporting member for breaking the spring catch for lowering the upper part of the supporting member into the tunnel.

In testimony whereof I affix my signature in presence of two witnesses.

PERCY EVERETT.

Witnesses:
   A. F. WALSH,
   H. A. LOEFFLER.